(12) United States Patent
Haberer

(10) Patent No.: US 6,786,630 B2
(45) Date of Patent: Sep. 7, 2004

(54) SCREW FOR A PLASTICS PROCESSING MACHINE, AND METHOD OF REGENERATING A SCREW

(75) Inventor: Achim Haberer, Garching (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 0 days.

(21) Appl. No.: 10/143,193

(22) Filed: May 10, 2002

(65) Prior Publication Data

US 2002/0136083 A1 Sep. 26, 2002

Related U.S. Application Data

(63) Continuation of application No. PCT/EP00/10488, filed on Oct. 25, 2000.

(30) Foreign Application Priority Data

Nov. 17, 1999 (DE) .......................................... 199 55 485

(51) Int. Cl.$^7$ ............................................... B28D 7/14
(52) U.S. Cl. ..................................... 366/79; 29/402.18
(58) Field of Search ........................... 366/79; 425/208, 425/168; 420/453, 429, 428; 427/446; 29/402.18

(56) References Cited

U.S. PATENT DOCUMENTS

| | | | | |
|---|---|---|---|---|
| 3,819,384 A | * | 6/1974 | Ingham et al. ............... 75/255 |
| 3,936,295 A | * | 2/1976 | Cromwell et al. ........... 427/446 |
| 3,991,240 A | * | 11/1976 | Harrington et al. ......... 427/446 |
| 4,571,983 A | * | 2/1986 | Sanborn et al. .......... 29/402.18 |
| 4,612,256 A | * | 9/1986 | Neuhauser et al. .......... 428/547 |
| 4,692,305 A | * | 9/1987 | Rangaswamy et al. ...... 420/453 |
| 4,766,042 A | * | 8/1988 | Otani .......................... 428/679 |
| 4,949,836 A | * | 8/1990 | Schostek ..................... 366/79 |
| 5,135,378 A | * | 8/1992 | Catton ......................... 425/208 |
| 5,352,539 A | * | 10/1994 | Psiuk ............................ 366/84 |
| 5,405,660 A | * | 4/1995 | Psiuk et al. .................. 427/597 |
| 5,593,726 A | * | 1/1997 | Nicholls et al. ............. 427/189 |
| 5,595,616 A | * | 1/1997 | Berczik ....................... 420/429 |
| 5,673,618 A | * | 10/1997 | Little ........................... 100/145 |
| 5,690,716 A | * | 11/1997 | Sampath ....................... 75/231 |
| 5,693,156 A | * | 12/1997 | Berczik ....................... 148/407 |
| 6,238,807 B1 | * | 5/2001 | Yasuda et al. .............. 428/627 |

FOREIGN PATENT DOCUMENTS

| | | |
|---|---|---|
| CH | 576 526 | 6/1976 |
| CH | 669 212 A | 2/1989 |
| DE | 31 878 | 3/1965 |
| DE | 20 22 803 | 11/1970 |
| DE | 36 38 088 A | 5/1988 |
| DE | 37 18 779 A | 12/1988 |
| WO | WO 97/13001 | 4/1997 |

OTHER PUBLICATIONS

G. Cogliati: "Gruppi di Plastificazione: Technologie per allungarne la vita", in Interplastics, Italy, Technique Nuove, Milan, vol. 20, No. 8, Nov. 1, 1997, pp. 80–84, XP000724044.

* cited by examiner

*Primary Examiner*—Tony G. Soohoo
(74) *Attorney, Agent, or Firm*—Henry M. Feiereisen

(57) ABSTRACT

A screw for a plastics processing machine includes a screw body made of a base material, which is no longer useful as a consequence of wear. A single-ply or multi-ply a buffer layer made of magnetically conductive metallic material is applied onto the crest of the screw body by means of a thermal spraying process, and a wear-reducing coating made of molybdenum or a molybdenum-containing alloy and applied onto the buffer layer by means of a thermal spraying process This provides a simple way of ensuring that the regenerated screw has a long service life and is resistant to heavy loads.

14 Claims, 1 Drawing Sheet

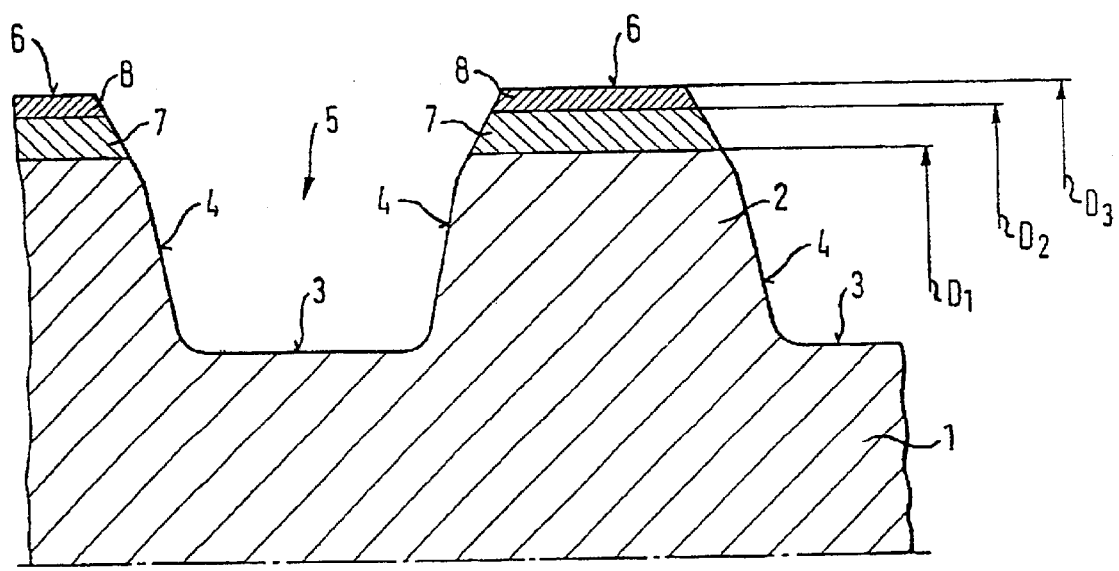

SCREW FOR A PLASTICS PROCESSING MACHINE, AND METHOD OF REGENERATING A SCREW

CROSS-REFERENCES TO RELATED APPLICATIONS

This application is a continuation of prior filed copending PCT International application no. PCT/EP00/10488, filed Oct. 25, 2000.

This application claims the priority of German Patent Application Serial No. 199 55 485.4, filed Nov. 17, 1999, pursuant to 35 U.S.C. 119 (a)–(d), the subject matter of which is incorporated herein by reference.

BACKGROUND OF THE INVENTION

The present invention relates, in general, to a screw for a plastics processing machine. The present invention further relates to a method of regenerating a screw for a plastics processing machine.

Regeneration or rehabilitation of screws, such as extruder screws, that are no longer useful as a result of wear is normally realized by grinding the worn-out screw flights to a uniform reference diameter and subsequently building up a new coating which corresponds to the desired size or the dimensions of a new screw and has the required wearing protective layer upon the crest of the screw flights.

In general, an extruder screw becomes useless and must be regenerated, when wear leads to a decrease in diameter of about 2 mm. According to a conventional regeneration process, the screw flights are at first ground to a uniform reference diameter and coated during a subsequent hard-facing step through welding with a buffer layer which essentially replaces again the flight regions reduced through wear and erosion.

The surface of the weld-on buffer layer is polished and subsequently lined with a wearing protective layer by means of a thermal spraying process. The melt applied during the hard-facing step exposes the base material of the screw to great thermal stress, which may result in structural changes that impair the adhesion capability of the layer and in crack formation. Furthermore, there is a risk of distortion of the screw, thereby adversely affecting the rotational accuracy. The required alignment process involves a further risk of formation of cracks. Moreover, screws with chromium-plated screw threads suffer the problem of separation of the chromium layer from the screw flank in the area of melt application.

Swiss Pat. No. CH 669212 discloses a method of making an extruder screw in which the screw root as well as the screw flights and a wear-resistant material layer are built-up solely from individual metal layers through thermal coating technique. In this process, the geometric buildup of the screw flights is in the foreground, whereby no measures are disclosed as to how in a base screw body made of a uniform base material and including the screw flights, the worn-off screw can be so regenerated again that a wear-reducing coating can be connected to the base material, without risk of detachment.

It would therefore be desirable and advantageous to provide an improved screw for a plastics processing machine and an improved method of regenerating a worn screw, to obviate prior art shortcomings and to provide a regenerated screw with a long service life while being capable to absorb high loads.

SUMMARY OF THE INVENTION

According to one aspect of the present invention, a screw for a plastics processing machine, includes a screw body made of a base material, which is no longer useful as a consequence of wear, with the screw body including a screw flight having a crest; a buffer layer made of magnetically conductive metallic material and applied onto the screw crest of the screw body through a thermal spraying process; and a wear-reducing coating made of molybdenum or a molybdenum-containing alloy and applied onto the buffer layer through a thermal spraying process.

The buffer layer may be a single-ply or multi-ply buffer layer and may be made of chromium steel with a content of Cr of 10 to 16 wt. %, preferably 13 wt %. Te buffer layer may have a thickness in the range from 0.1 to 1.2 mm. The coating may contain at least at 30 wt % of molybdenum, or may be made almost entirely of molybdenum. The thickness of the coating may be in the range of 0.3 to 0.5 mm, preferably 0.4 mm.

According to another aspect of the present invention, a method of regenerating a worn extruder screw, includes the steps of abrading the crest of screw flights of a screw body to a uniform diameter; depositing a buffer layer of magnetically conductive metallic material onto the crest at a thickness to compensate for a diameter reduction of the screw body as a consequence of wear and abrasion to a uniform diameter; and applying a wear-reducing coating of molybdenum or a molybdenum-containing alloy onto the buffer layer through a thermal spraying process.

According to another feature of the present invention, the surface of the abraded screw body is suitably roughened through a blasting process.

According to another feature of the present invention, the thermal spraying process may be a wire flame spraying process.

BRIEF DESCRIPTION OF THE DRAWING

Other features and advantages of the present invention will be more readily apparent upon reading the following description of currently preferred exemplified embodiments of the invention with reference to the accompanying drawing, in which FIG. 1 shows a schematic fragmentary cross sectional view of a screw, embodying the present invention;

DETAILED DESCRIPTION OF PREFERRED EMBODIMENTS

Turning now to FIG. 1, there is shown a schematic fragmentary cross sectional view of a screw 1, e.g. a cylindrical extruder screw. The screw 1 has a screw channel 5, generally designated by reference numeral 5. The screw channel 5 is bounded by flanks 4 of a screw flight 2 and root 3 of the screw 1, and can be lined with a chromium layer, not shown. The screw flight 2, as used herein, is defined as a helical ridge that is attached to a shaft so as to allow conveyance of a material along the length of the shaft when the screw is rotated about its longitudinal axis. The screw flight 2 has a top surface to form crest 6.

The top surface of the screw flight 2 is formed by a buffer layer 7 of magnetically conductive metallic material, e.g., a chromium steel with a content of Cr of 10 to 16 wt. %, preferably 13% chromium steel, and a wear-reducing coating 8 of 99 wt % molybdenum or a molybdenum-containing material with at least 30 wt % of molybdenum. The buffer layer 7 is connected to the base material of the screw flight 2 and has a thickness from 0.1 to 1.2 mm. In the non-limiting limiting example of the screw 1 involved here, the buffer layer 7 has a thickness of about 1 mm. The coating 8 has a thickness from 0.3 to 0.5 mm. In the non-limiting limiting example of the screw 1 involved here, the coating 8 has a thickness of about 0.4 mm.

As the screw 1 wears off during operation, it becomes no longer useful and needs to be rehabilitated. Regeneration of the worn screw 1 is realized by abrading, e.g. grinding, the screw flight 2 to a uniform diameter $D_1$, and subsequently roughening the abraded surface by means of a blasting process. Subsequently, one or more plies of buffer layer 7 is applied at a thickness of about 1 mm upon the roughened surface by means of a wire flame spraying process until realizing a diameter $D_2$. Then, the wear-reducing coating 8 is deposited onto the non-finished surface of the buffer layer 7, also by means of a wire flame spraying process, and subsequently polished to realize the end diameter $D_3$ of the finally regenerated screw.

The buffer layer 7 essentially compensates the reduction in diameter as a result of wear and the grinding process. The wear-reducing coating 8 has an optimum thickness in the range of 0.4 mm. The thickness of the coating 8 can be determined during manufacture and regeneration of the screw 1 and after particular operating intervals by means of a magnetic thickness measuring instrument which accurately ascertains the distance between the surface of the non-magnetic coating 8 and the surface of the buffer layer 7 of magnetically conductive material.

The application of the coating 8 onto the buffer layer 7 by means of a thermal spraying process, such as wire flame spraying does not require a preceding roughening of the surface of the buffer layer 7 because the texture of the buffer layer 7 deposited by a thermal spraying process is porous enough and has such a rough surface that the sprayed particles of the coating 8 firmly connect with the buffer layer 7 through mechanical interlocking.

In the event the buffer layer 7 is applied through a hard-facing process, it is required that the buffer layer is polished and subsequently roughened by a blasting process.

The present invention has been described with reference to the regeneration of a cylindrical screw, it is, however, equally applicable to a conical screw.

While the invention has been illustrated and described as embodied in a screw for a plastics processing machine, and method of regenerating a screw, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A screw for a plastics processing machine, comprising:
   a screw body made of a base material, which is no longer useful as a consequence of wear, said screw body including a screw flight having a crest;
   a buffer layer made of magnetically conductive metallic material and applied onto the crest of the screw body by means of a thermal spraying process to compensate for a diameter reduction of the screw body as a consequence of wear and abrasion, wherein the buffer layer is made of chromium steel with a content of Cr of 10 to 16 wt. %; and
   a wear-reducing coating made of molybdenum or a molybdenum-containing alloy and applied onto the buffer layer by means of a thermal spraying process.

2. The screw of claim 1 in the form of an extruder screw.

3. The screw of claim 1, wherein the buffer layer is of single-ply or multi-ply configuration.

4. The screw of claim 1, wherein the buffer layer is made of chromium steel with a content of Cr of 13 wt %.

5. The screw of claim 1, where in the coating contains at least at 30 wt % of molybdenum.

6. The screw of claim 1, wherein the coating is made almost entirely of molybdenum.

7. The screw of claim 1, wherein the buffer layer has a thickness in the range from 0.1 to 1.2 mm.

8. The screw of claim 1, wherein the coating has a thickness in the range of 0.3 to 0.5 mm.

9. The screw of claim 1, wherein the coating has a thickness of 0.4 mm.

10. A method of regenerating an extruder screw which has been reduced in diameter through wear during use, comprising the steps of:
    abrading the crest of screw flights of a screw body to a uniform diameter;
    depositing a buffer layer of magnetically conductive metallic material onto the crest at a thickness to compensate for the diameter reduction of the screw body as a consequence of wear and abrasion to a uniform diameter, wherein the buffer layer is made of chromium steel with a content of Cr of 10 to 16 wt. %; and
    applying a wear reducing coating of molybdenum or a molybdenum-containing alloy onto the buffer layer through a thermal spraying process.

11. The method of claim 10, wherein the buffer layer is a single-ply or multi-ply buffer layer.

12. The method of claim 10, and further comprising the step of roughening the surface of the abraded screw body through a blasting process.

13. The method of claim 10, wherein the thermal spraying process is a wire flame spraying process.

14. The method of claim 10, and further comprising the step of measuring a distance between a nonmagnetic surface of the coating and a magnetic surface of the buffer layer to thereby determine a thickness of the applied coating.

* * * * *